United States Patent [19]
Gaston et al.

[11] Patent Number: 5,051,719
[45] Date of Patent: Sep. 24, 1991

[54] THICK-FILM NON-STEP RESISTOR WITH ACCURATE RESISTANCE CHARACTERISTIC

[75] Inventors: Robert D. Gaston, Dearborn Heights, Mich.; Daxesh K. Patel, Hatfield, Pa.

[73] Assignee: Ford Motor Company, Dearborn, Mich.

[21] Appl. No.: 536,362

[22] Filed: Jun. 11, 1990

[51] Int. Cl.⁵ .............................................. H01C 10/32
[52] U.S. Cl. .................................... 338/162; 338/195; 338/309; 29/610.1
[58] Field of Search .................... 338/162, 309, 33, 42, 338/160, 161, 171, 172, 195; 73/313, 315, 317, 708; 29/610.1

[56] References Cited
U.S. PATENT DOCUMENTS

| | | | |
|---|---|---|---|
| 3,564,475 | 2/1971 | Fujii et al. | 338/120 |
| 4,243,969 | 1/1981 | Steigerwald et al. | 338/309 |
| 4,293,839 | 10/1981 | Asada et al. | 338/309 |
| 4,318,075 | 3/1982 | Pudelko et al. | 338/162 |
| 4,345,235 | 8/1982 | Riley et al. | 338/176 |
| 4,495,524 | 1/1985 | Kakuhashi et al. | 338/314 |
| 4,500,866 | 2/1985 | Romann et al. | 338/126 |
| 4,751,492 | 6/1988 | Tsuzuki et al. | 338/176 |
| 4,873,865 | 10/1989 | Gaston | 338/33 X |
| 4,928,526 | 5/1990 | Weaver | 338/33 X |
| 4,947,150 | 8/1990 | Wassertrom | 338/42 |

FOREIGN PATENT DOCUMENTS 2127974 7/1983 United Kingdom .

Primary Examiner—Marvin M. Lateef
Attorney, Agent, or Firm—Mark Mollon; Paul K. Godwin

[57] ABSTRACT

A smooth resistance characteristic, a reduction in component cost, and high durability are achieved for a variable resistor card formed using thick-film silk screen deposition. An arcuate wiper track and radial extension areas are all formed of a resistance material deposited using silk screen techniques. Laser trimming of the extension areas provides a desired characteristic of resistance versus sweep angle for the variable resistor. The resistance characteristic is continuous and non-stepped, thereby avoiding the creation of spikes caused by small circuit breaks during sweeping movement of the wiper contact.

25 Claims, 4 Drawing Sheets

THICK-FILM NON-STEP RESISTOR WITH ACCURATE RESISTANCE CHARACTERISTIC

BACKGROUND OF THE INVENTION

The present invention relates in general to variable resistors, and more specifically to a thick-film resistor card employed in a transducer for converting a physical position into an electrical signal.

Variable resistors are known for sensing parameters in various applications. For example, the fuel level in an automobile fuel tank is typically measured using a variable resistor having a sweep arm attached to a float. The sweep arm position is determined by the level of fuel in the tank and the voltage values sensed across the variable resistor depends on the position of the sweep arm.

The most successful prior art variable resistor design has been the stepped resistor. In one type of stepped resistor, a high resistance wire is wrapped around a core such that the sweep arm slides from one wrapped loop to the next, resulting in resistance steps. Another stepped design includes a silk screen printed thick-film resistor card in which resistor ink and conductor ink are deposited on a substrate. A large number of conductor lines are formed in parallel and extend from the area containing the deposited resistive material to form a sliding wiper contact area.

As the sweep-arm wiper contact moves from one step to the next, small circuit breaks occur. These breaks cause spikes in the electrical characteristic of the variable resistor. The spiking problem is particularly acute when using digital electronic gages which employ very low amperage signals (e.g., in the range of 10-20 milliamps). The spikes must be electrically filtered prior to applying the resistor output signal to the gage to avoid flickering of the digital display. Thus, it would be desirable to eliminate spiking and thereby avoid the need for a filter.

In order to provide the required accuracy in the desired resistance characteristic according to sweep arm angle, thick-film resistor cards must be calibrated on an individual basis. The desired resistance characteristic is determined so that resistance values along the sweep arm path correspond to volume values of fuel remaining in the fuel tank. Calibration is achieved by trimming resistance material in the cards. For accuracy, the resistance characteristic is monitored during the trimming adjustment. In stepped resistor designs, the resistance characteristic is monitored using measurement pads which are connected to selected ones of the conductor lines. Thus, while it is desirable to eliminate the steps in the resistor, it is desirable to maintain the ability to monitor the resistance characteristic.

It is also desirable that the variable resistor withstand wear so as to maintain the resistance characteristic over an extended lifetime. It is further desirable that the trimming and assembly operations of the variable resistor be adaptable to automation.

U.S. Pat. No. 4,318,075 issued to Pudelko et al discloses a thick-film potentiometer wherein the wiper track providing the contact area for the moving sweep arm is comprised solely of conductor lines deposited on a substrate in a parallel fashion. The wiper track composed of conductor lines is subject to the small circuit breaks and spikes described earlier. Furthermore, the conductor lines are subject to wear which can lead to a complete failure of the potentiometer at various locations along the wiper track.

Copending application Ser. No. 290,011, filed Dec. 27, 1988, and assigned to Ford Motor Company, teaches a stepped resistor card wherein the conductor lines in the arcuate sweep path have a resistive material deposited thereon. The overprint of resistive material reduces the wear occurring in the sweep path without any substantial effect on the resistance of the variable resistor. However, signal spikes are not eliminated since the gaps between conductor lines are not eliminated.

U.S. Pat. No. 4,500,866, issued to Romann et al, teaches a nonlinear potentiometer including an arcuate resistor pad connected to a plurality of parallel resistor pads by means of a plurality of conductor lines. Such a resistor arrangement is not adaptable to a linear or a well-controlled resistance characteristic because the use of parallel resistors results in an averaging of resistance over the large sweep angles between conductor lines. Furthermore, the specific resistance characteristic that can be obtained in Romann et al is strictly limited by the layout of resistor pads. In addition, the ability to change potentiometer resistance through trimming is limited by the use of parallel resistors pads. Resistor instabilities are caused by extreme trims and the process yield for manufacturing of the potentiometer is low.

SUMMARY OF THE INVENTION

It is a principal object of the present invention to provide a variable resistor apparatus with a smooth and accurately controllable resistance characteristic.

It is another object of the invention to avoid spaced conductor lines in the wiper track of a variable resistor while providing a resistor capable of being accurately calibrated to a desired resistance characteristic along the wiper track.

It is a further object of the invention to provide a thick-film resistor wherein a single resistor card design can be easily adapted to different resistance characteristics without resort to changing of the patterns of the resistance pads and the conductor pads deposited thereon.

It is yet another object of the invention to improve the accuracy of calibration of a thick-film variable resistor.

These and other important objects are achieved according to the present invention wherein a variable resistor includes a substrate having a generally arcuate-shaped thick-film resistor deposited thereon. The thick-film resistor provides an arcuate wiper track with a plurality of angularly offset extension areas extending radially from the area of the wiper track. The extension areas preferably include a first extension area in the arcuately central portion of the thick-film resistor which is disposed radially inward from the wiper track and a pair of second extension areas at the arcuate end portions of the thick-film resistor and disposed radially outward from the area of the wiper track. The extension areas have a size intended to provide a resistance lower than the desired final resistance and provide an area in which trimming can be employed to individually adjust and calibrate the resistance characteristic of a variable resistor to a desired characteristic.

A wiper contact slidably engages the wiper track. Since there are no steps in the wiper path, the occurrence of signal spikes is substantially eliminated. An end pad, preferably comprised of a conductive material, is deposited on the substrate in electrical connection to one end of the wiper track. The variable resistance of the resistor appears between the end pad and the wiper contact.

Measurement pads provide contact points during trimming of the resistor to measure the resistance characteristic at predetermined points along the wiper track. Even greater accuracy in the determination of the actual resistance characteristic during the trimming operation can be achieved by employing contact points directly within the wiper track. In one embodiment, measurement pads comprised of a conductive material are located within spaced windows located along the wiper track.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
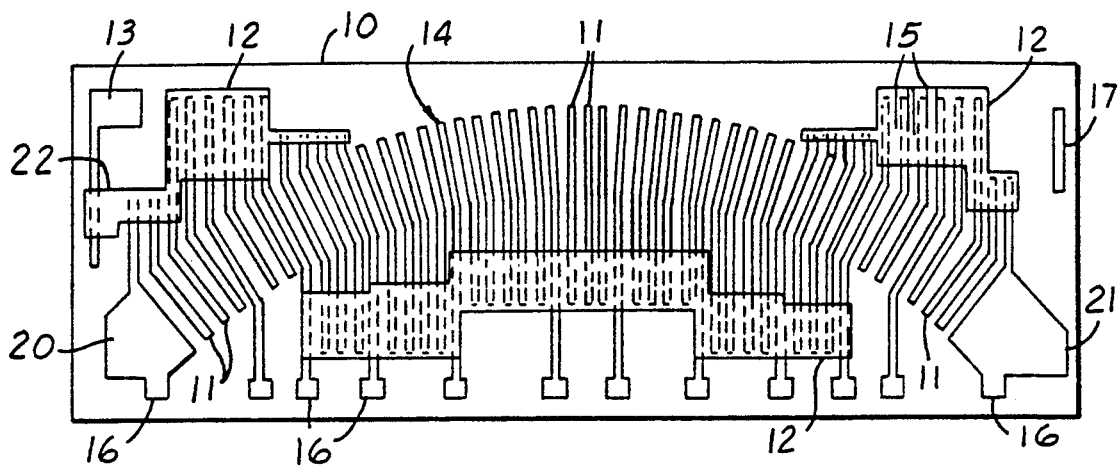
FIG. 1 is a plan view showing a thick-film resistor card as employed in the prior art.

Referring to FIG. 1, a prior art stepped resistor card includes a substrate 10. A plurality of conductor lines 11 are deposited on substrate 10 which also has areas of resistive material 12 deposited thereon in a thick film. A conductive end pad 13 is deposited at one end of the resistor card to provide a first electrical connection to the variable resistor. A wiper contact (not shown) slidably contacts an arcuate wiper track 14 formed by respective portions of conductor lines 11.

As the wiper contact steps from one conductor line to the next, an increased or decreased resistance is produced since the electrical path between end pad 13 and the wiper contact is either increased or decreased through resistive material 12. The desired stepped resistance characteristic is obtained by providing laser trim cuts, shown partially at 15, throughout the resistive material 12. A plurality of measurement pads 16 each at one end of respective conductor lines 11 are provided in order to monitor the resistance characteristic as it is adjusted by a laser trimming operation. A reference marker 17 is provided on substrate 10 for aligning the resistor card in a laser trimmer, and may, for example, be comprised of the conductor material deposited during a silk screening process to fabricate conductor lines 11.

Conductive dwell pads 20 and 21 can be provided at each end of the wiper track to provide a sweep arc of constant resistance at the beginning and end portions of wiper track 14. An offset resistor area 22 can be provided between end pad 13 and the first conductor line 11 for providing an minimum resistance offset in the resistance characteristic. The minimum offset resistance can be adjusted by laser trimming.

Figure 2:
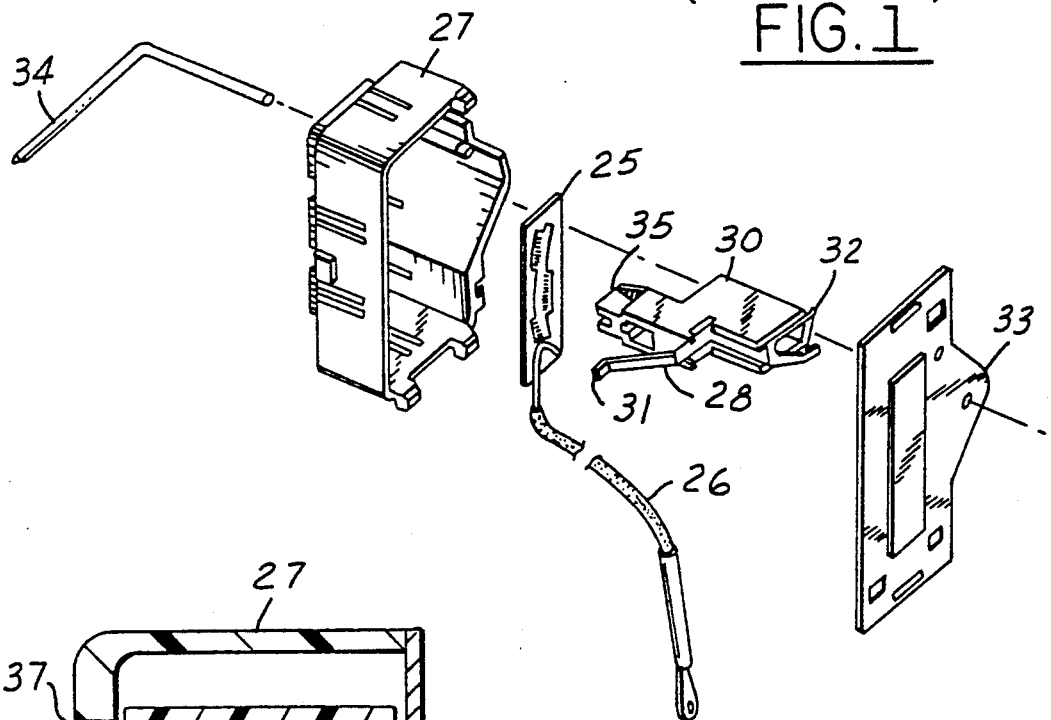
FIG. 2 is an exploded, perspective view of a fuel sender assembly including the variable resistor of the present invention.

FIG. 2 shows a complete variable resistor according to the present invention in an embodiment adapted for use as a fuel level sender for determining the level of fuel present in a fuel tank. A resistor card 25 has an electrical lead 26 connected thereto. Resistor card 25 is received in a housing 27. A spring contact 28 is secured to a carrier element 30 which is also received in housing 27. Spring contact 28 has a wiper contact 31 for slidably engaging resistor card 25 and a base contact 32 for contacting a metallic base 33. Base 33 snaps together with housing 27 to retain resistor card 25 and carrier element 30 therein. A float rod 34 passes through housing 27, carrier element 30, and metallic base 33. Carrier element 30 includes a fork end 35 which extends through housing 27 to grasp float rod 34 such that the pivoting of float rod 34 is transmitted to wiper contact 31. Preferably, fork end 35 allows limited movement of float rod 34 parallel to its pivot axis in order to reduce the transmission of vibrations to spring contact 28, as disclosed in copending application Serial No. 359,016, filed May 30, 1989, which is incorporated herein by reference.

The desired variable resistance appears between lead 26 and metallic base 33. Lead 26 may be connected to a gage driver circuit and metallic base 33 may be connected to ground, for example.

Figure 3:
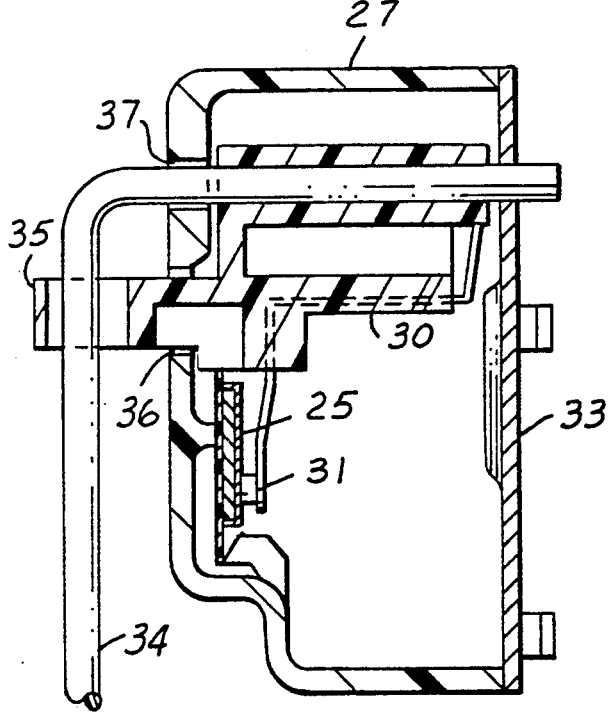
FIG. 3 is a side cross-sectional view of the assembled fuel sender of FIG. 2.

FIG. 3 shows a slot 36 in housing 27 through which fork end 35 of carrier element 30 passes. A hole 37 in housing 27 provides a pivot axis for float rod 34.

Figure 4:
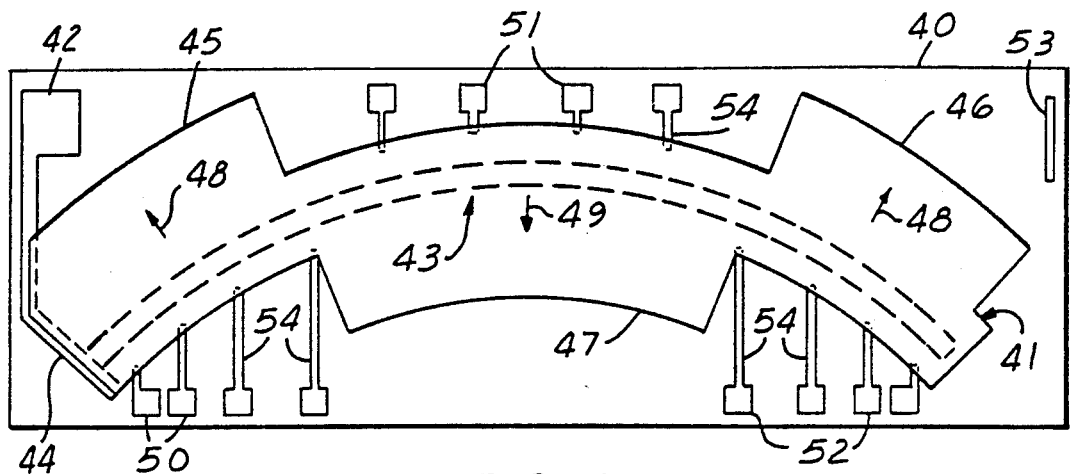
FIG. 4 is a plan view of a resistor card according to the present invention.

A first embodiment of the resistor card of the present invention is shown in FIG. 4. A substrate 40 is of insulating material and may be comprised, for example, of alumina or other ceramic material. A single, preferably continuous region of thick-film resistor material 41 is deposited on substrate 40. Resistor material 41 may be comprised, for example, of a cermet material which is a mixture of metal and dielectric materials for making thick-film resistive elements. One example of a resistor ink which can be used is BIROX thick-film resistor paste available from E. I. DuPont De Nemours & Company. Resistor material 41 has a pattern such that an arcuate wiper track 43 is provided with a resistance characteristic which is continuous (i.e., not stepped). The specific composition and thickness of resistor material 41 are selected in accordance with the desired resistance characteristic and other design choices.

An end pad 42 at one end of resistor material 41 is formed of a conductive material deposited on substrate 40 and may be comprised of a palladium/silver composite paste, for example. End pad 42 and resistor material 41 are electrically connected along a conductor strip 44 deposited beneath one end of resistor material 41.

A wiper contact (such as 31 shown in FIG. 2) slidably engages resistor material 41 along a defined arcuate wiper track 43. A desired resistance characteristic is obtained by employing extension areas disposed radially from wiper track 43. Specifically, an extension area 45 and an extension area 46 are disposed radially outwardly from wiper track 43 at the longitudinal ends of the resistor card as shown by radial arrows 48. An extension area 47 is disposed radially inward from wiper track 43 in the central region of the resistor card as shown by a radially inward arrow 49. Current flowing between conductor strip 44 and the wiper contact on wiper track 43 spreads out to occupy the available width of resistor material transversely along wiper track 43 in order to reduce the resistance to current flow as much as possible. Thus, extension areas 45, 46, and 47 are designed to provide a resistance which is less than or equal to the desired resistance characteristic when untrimmed. The extension areas are laser trimmed in order to individually calibrate each resistor card to provide the desired resistance characteristic.

Measurement pads 50, comprised of a conductive material, are in contact with resistor material 41 and spaced along wiper track 43 radially opposite extension area 45. Likewise, measurement pads 51 are located opposite extension area 47 and measurement pads 52 are located opposite extension area 46. Thus, the variable resistor of FIG. 4 is adapted to being laser trimmed by sequentially measuring the resistance between end pad 42 and each measurement pad. Calibration involves measuring the resistance between the first measurement pad and end pad 42 while a portion of the corresponding extension area, opposite the area between the first measurement pad and the end pad, is removed by laser trimming. Thereafter, each successive measurement ad is monitored while a respective portion of the corresponding extension area is trimmed. An alignment mark 53 is provided on substrate 40 to aid in the automated positioning of the measuring probes in the laser trimming equipment and the aiming of the laser beam. In addition, measurement pads 50, 51, and 52 may be used as additional targets for alignment of the resistor card in the laser trimmer. Measurement pads 50, 51, and 52 are connected to resistive material 41 through a plurality of .conductive fingers or lines 54.

Figure 5:
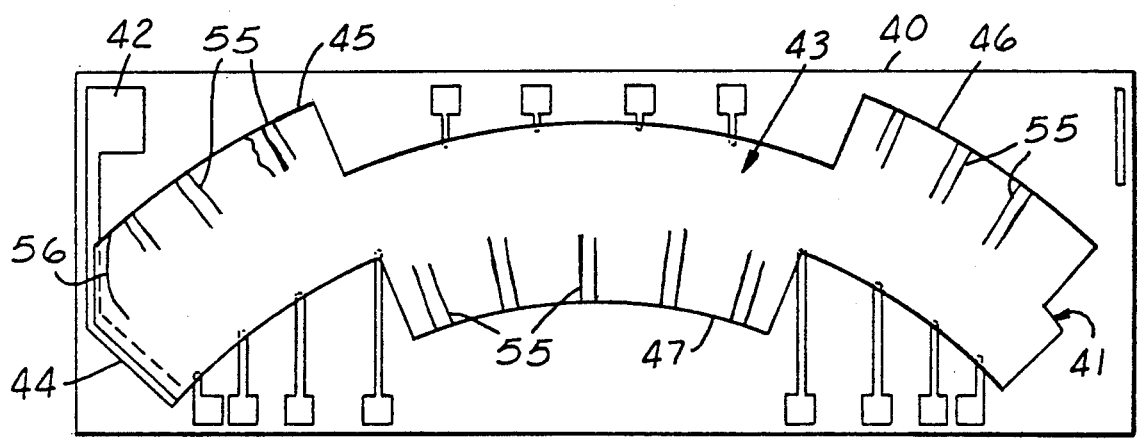
FIG. 5 is a plan view showing the resistor card of FIG. 4 further including radial trims for adjusting the resistance characteristic.

FIG. 5 illustrates a first technique for laser trimming of the resistor card of FIG. 4 by radial or plunge trimming. Radial trims 55 extend from the edges of extension areas 45–47 and plunge into the extension areas in a radial direction to the extent necessary during calibration to reduce the width of the effective current path along wiper track 43 and achieve the desired resistance characteristic. Preferably, one or more trims 55 can be introduced between adjacent measurement pad points. One advantage of having more than one trim between measurement points is to provide a smoother and more stable resistance characteristic. A laser trim 56 may be provided which is substantially radial but which deviates from the radial direction in order to accommodate the edge of the resistor card.

Figure 6:
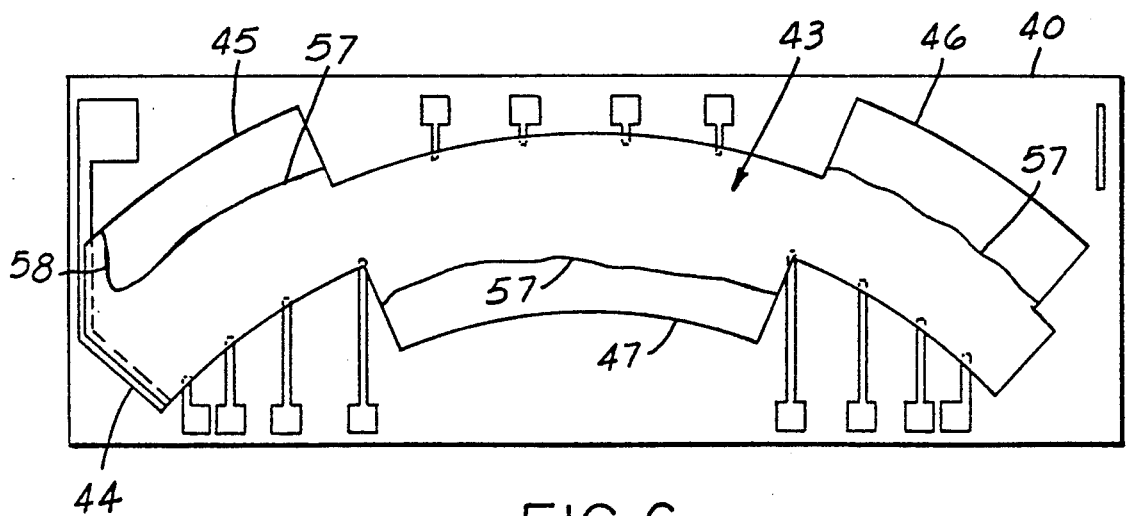
FIG. 6 is a plan view of the resistor card of FIG. 4 further including concentric trims for adjusting the resistance characteristic.

FIG. 6 illustrates an alternative technique for trimming the resistor card of FIG. 4 wherein the trim lines have at least a portion which is substantially concentric with the wiper track 43 so that resistance material in the extension areas 45–47 is electrically isolated from the resistor to give the desired resistance characteristic. Thus, substantially concentric laser trims 57 define the area for current flow along the arcuate wiper track. A laser trim 58 is provided, as shown, to allow a portion of extension area 45 to be electrically isolated without requiring trimming over the conductor strip 44. As a further alternative, the trimming techniques of FIGS. 5 and 6 can be combined such that concentric trims are first applied to approach the desired resistance characteristic and then radial trims are applied in order to more closely approximate the desired characteristic.

Figure 7:
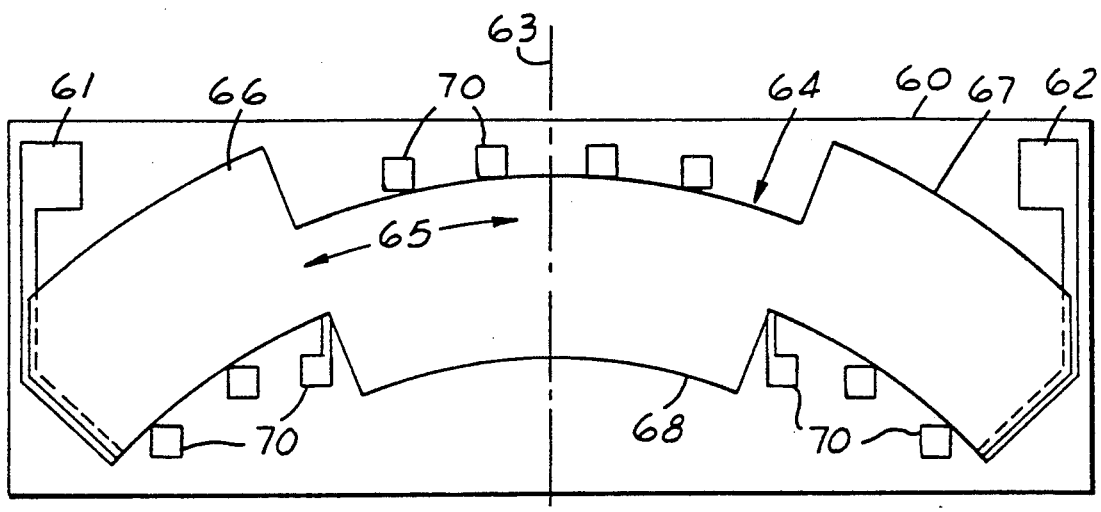
FIG. 7 is a plan view of an alternative embodiment for the resistor card of the present invention wherein the resistor card is symmetrical about a vertical center line.

FIG. 7 shows a further embodiment of the present invention wherein the resistor card has a pattern which is left-right symmetrical so that an end pad (and thus the low resistance sweep angle in the resistance characteristic) can be selected at either end of the resistor card. This symmetry allows the empty and full fuel level indicating positions for a variable resistor to be located at either end of the resistor card. This permits various positional placements of the variable resistor within the vehicle fuel tank.

A substrate 60 has a first end pad 61 and a second end pad 62 deposited on opposite ends thereof. The end pads are formed with mirror-image symmetry about a center line 63. A thick-film resistor 64 is deposited on substrate 60 with mirror-image symmetry around center line 63. Resistor 64 defines an electrically continuous wiper track area 65 with extension areas 66–68. A plurality of measurement pads 70 are connected to thick-film resistor 64 along wiper track 65 opposite the extension areas. Some of measurement pads 70 are in direct connection with wiper track 65 without using a conductive finger or line. The resistor card of FIG. 7 can be laser trimmed to provide a desired characteristic as previously described. Either end pad 61 or end pad 62 can be selected to provide the reference point for calibration and for subsequent connection to a voltage source when used to convert the position of a wiper contact to a resistance value.

Figure 8:
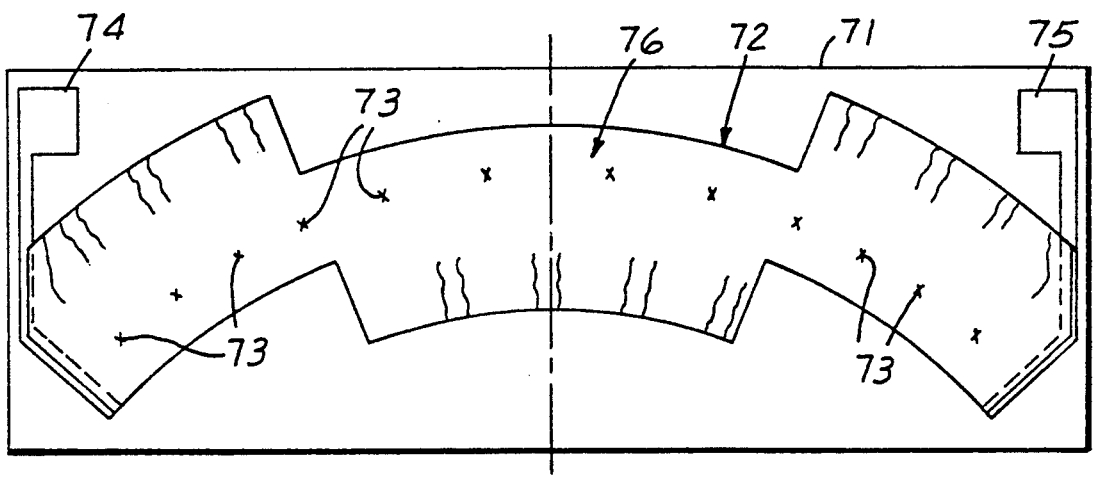
FIG. 8 is a plan view showing the resistor card of FIG. 7 including radial trims.

The conductive paste (e.g., usually palladium and/or silver) used in the resistor card embodiments of FIGS. 4–7 is relatively expensive compared to the thick-film resistive material. Therefore, a further embodiment of the invention is shown in FIG. 8 wherein the measurement pads are deleted from the resistor card. A thick-film resistor 72 is deposited on a substrate 71 such that the thick-film resistor is mirror-image symmetrical. In performing a laser trimming operation to calibrate the resistance characteristic of the resistor card, a first resistance measurement probe contacts either an end pad 74 or an end pad 75 and a second resistance measurement probe directly contacts thick-film resistor 72 in the defined wiper track 76 at predetermined points 73. By measuring the resistance characteristic directly in wiper track 76, the resistance characteristic can be more accurately measured and adjusted than in the previously described embodiments.

Figure 9:
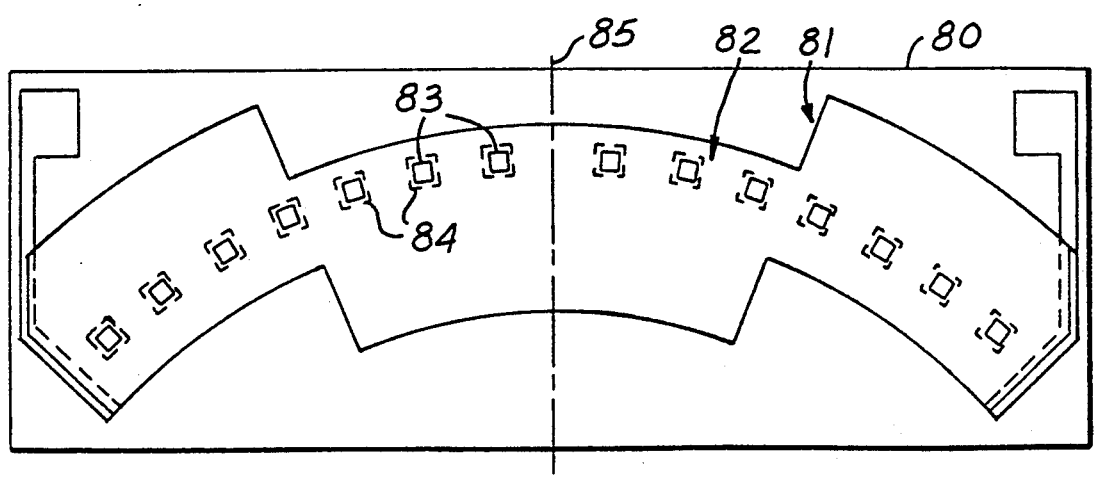
FIG. 9 is a plan view of yet another embodiment of the resistor card of the present invention wherein measurement pads are provided in the wiper track.

Accurately locating the predetermined measuring points as shown in FIG. 8 may be beyond the practical capability of some laser trimming equipment adapted for trimming variable resistor cards however. Therefore, FIG. 9 shows an embodiment wherein the improved accuracy of measuring directly within the wiper track is combined with the use of measurement pads to reduce the needed accuracy for positioning a resistance measuring probe. A thick-film resistor 81 is deposited on a substrate 80 and has a defined wiper track 82 and a plurality of extension areas. Thick film resistor 81 includes a plurality of windows 83 located in wiper track 82 which preferably are spaced in a symmetrical manner around a defined center line 85. A plurality of measurement pads 84 are disposed in windows 83. Measurement pads 84 are deposited prior to deposition of thick-film resistor 81 such that the edges of each measurement pad 84 is disposed beneath the edges of each respective window 83. Thus, greater accuracy is achieved in the resistance characteristic while relaxing the requirement for accurate positioning of the measurement probe.

Figure 10:
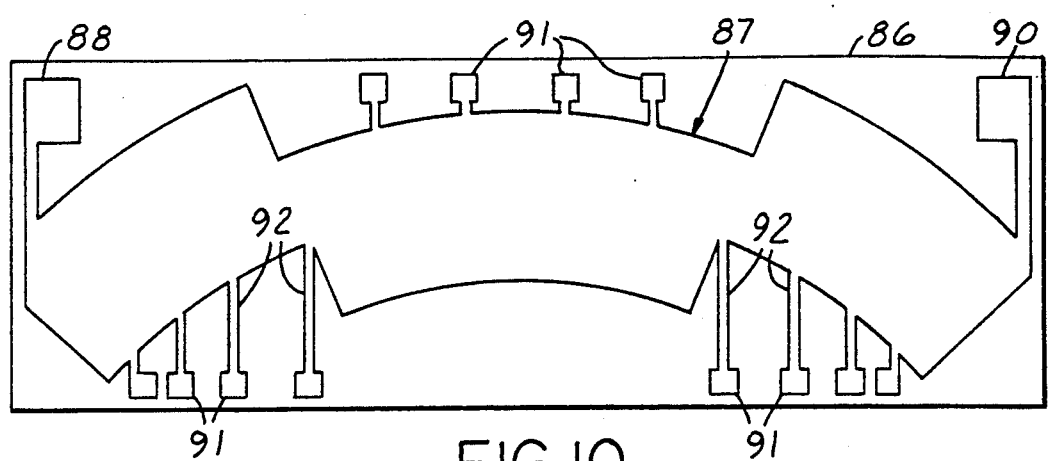
FIG. 10 is a plan view of yet another embodiment of the resistor card of the present invention wherein only resistive material and no conductive material is deposited on the substrate.

FIG. 10 shows a further embodiment wherein all the conductive material is eliminated from a resistor card and resistive material is exclusively deposited on a substrate. A ceramic substrate 86 has a thick-film resistive material 87 deposited thereon. In addition to the defined wiper track and the extension areas, a first end pad 88, a second end pad 90, measurement pads 91, and fingers 92 are formed of a single layer of resistive material. In this embodiment, the resistance between each respective measurement pad and the wiper track must be accounted for during laser trimming calibration of the resistance characteristic. Furthermore, the permanent connection of an end pad to an electrical lead wire cannot be soldered as with conductive metal end pads. Rather, a terminal pressure clip can be employed for connecting a lead wire to either end pad 88 or 90.

Figure 11:
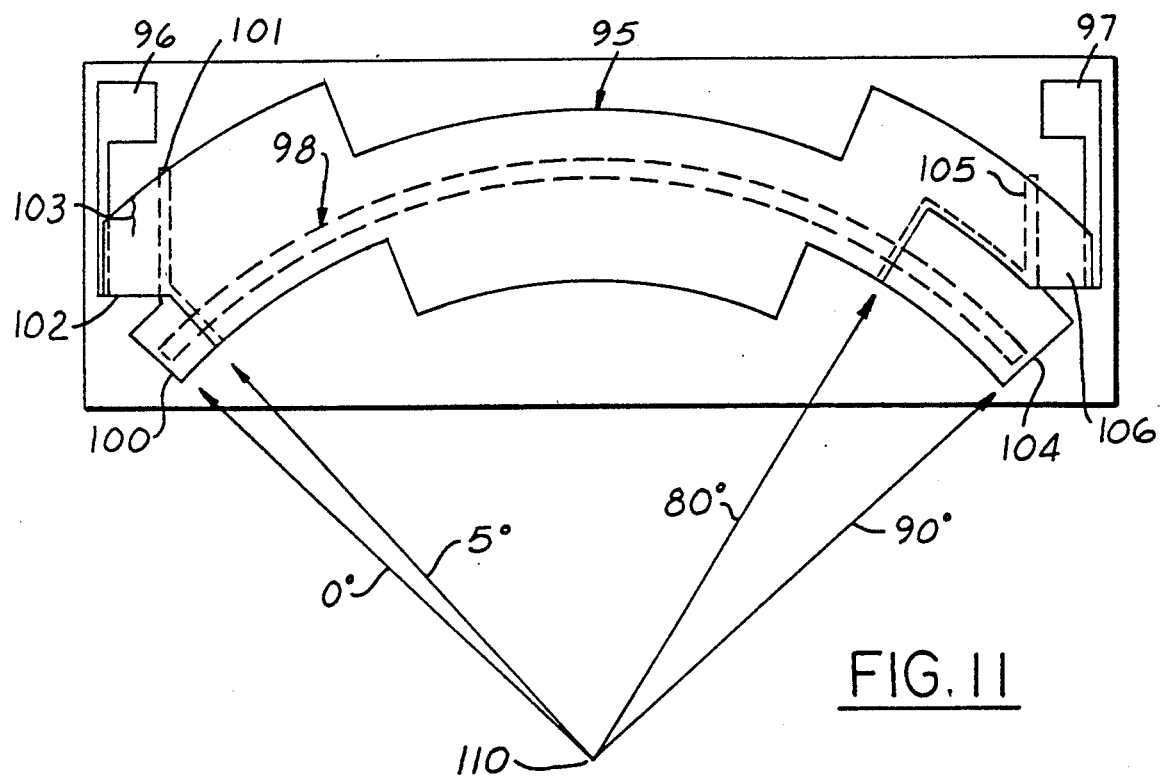
FIG. 11 is a plan view of yet another embodiment of the resistor card of the present invention wherein contact dwell pads are provided at the beginning and/or end of the wiper track.

Further modifications to the thick-film resistor of the present invention are shown in FIG. 11, including the use of contact dwell pads at the end of the wiper track and the use of an offset resistor connecting an end pad with the wiper track. Thus, a substrate 94 has a thick-film resistor 95 deposited thereon. End pads 96 and 97 are deposited on substrate 94 at opposite ends of thick-film resistor 95. A wiper track 98 arcuately extends over thick-film resistor 95, a contact dwell pad 100 and a contact dwell pad 104. A conductive strip 101 extends from dwell pad 100 beneath a portion of thick-film resistor 95 to provide an offset resistor area 102 between dwell pad 100 and end pad 96. Offset resistor 102 has a resistance adjusted by a laser trim 103.

Contact dwell pad 104 at the opposite end of wiper track 98 may include a conductive strip 105 for providing an offset resistance 106 between dwell pad 104 and end pad 97. Contact dwell pad 100 and contact dwell pad 104 may be of the same or different sizes depending on the particular fuel tank application. Contact dwell pads of the same angular size at each end provide a most preferred embodiment because a versatile resistor card results which can be easily adapted to lead wire connection at either end of the resistor card and to a wide variety of fuel tank profiles and resistor characteristics. Thus, the number of resistor card designs that must be supported by the manufacturing operation are reduced, thereby reducing manufacturing costs.

A pivot point 110 in FIG. 11 coincides with the pivot axis of the wiper contact of the variable resistor and may coincide with the pivot axis of the float arm in a fuel tank, for example. Dwell pad 100 is shown having a size corresponding to 5° of arc. Dwell pad 104 is shown having a size corresponding to 10° of arc. Thus, in one embodiment, a first connection to the variable resistor is made at end pad 96 and corresponds to the empty fuel level. Contact of the wiper with dwell pad 100 results in the indication of a single (i.e., "empty") level indication corresponding to a fixed resistance provided through offset resistor 102. A variable fuel level is indicated at positions between 5° and the beginning of contact dwell pad 104 at 80°. A similar effect is achieved at the full fuel level between 80° and 90° when the wiper contact is engaging dwell pad 104. Therefore, a single design of a variable resistor card can be used in a plurality of vehicle applications wherein a single fuel tank design is employed having means to produce different fill capacities, as is commonly done in the automotive industry.

Figure 12:
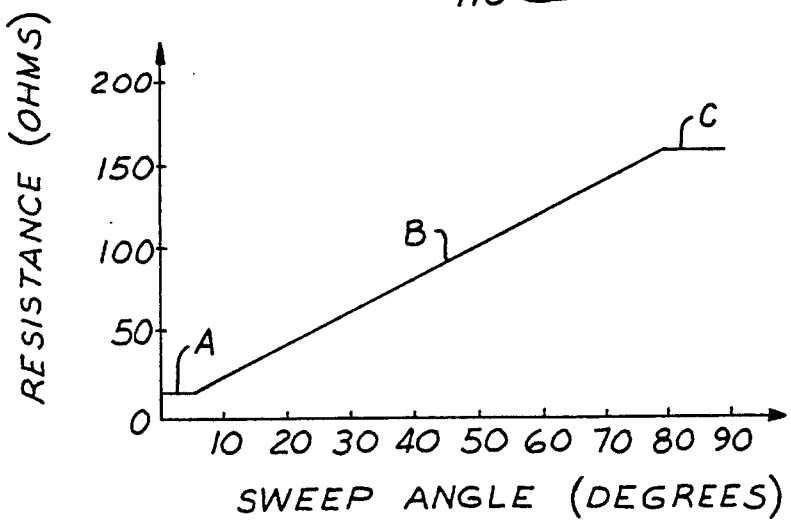
FIG. 12 is a plot showing the resistance characteristic of the resistor card of FIG. 11.

FIG. 12 shows the desired resistance characteristic corresponding to the resistor card of FIG. 11. A constant resistance is produced at sweep angles between zero and 5° as shown at A. Between angles from 5° to 80° of sweep, a linearly increasing resistance characteristic at B is derived according to the laser trimming adjustment of the extension areas. A constant resistance is produced at C between sweep angles of 80° and 90° to provide a full fuel level indication.

Each of the foregoing embodiments of the present invention can be fabricated by well known silk screen deposition techniques. In each of the illustrated embodiments employing both conductive inks and resistive inks in the silk screen process, the conductive ink is deposited prior to deposition of the resistive material.

The laser trimming of individual resistor cards according to the present invention can be achieved using existing computer controlled probe and measurement systems. By employing X-Y positioning control for the laser cutting and for the resistance measurement probes, such systems cut through the resistive material into the ceramic substrate while measuring the resistance being adjusted during cutting. The present invention preferably employs laser trim cuts having a width in the range of 3-5 mils. A commercial laser trimming system which is commercially available and which meets the requirements for performing the present invention is the CLS 37 E closed loop laser trim system manufactured by Chicago Laser Systems, Inc.

The foregoing invention provides a continuously variable resistor which eliminates stepping spikes caused as the wiper contact sweeps through various angles. Therefore, the need for conventional electronic filtration of the output signal from the variable resistor is eliminated or reduced. The resistance characteristic of the variable resistor can be easily and accurately calibrated by removal of resistance material from the extension areas.

Manufacturing and design complexity of the variable resistor is greatly reduced. A single generic pattern design for the conductor and resistor inks in the silk screen printing process can be used for a large number of different resistance characteristics. The left-right symmetrical design allows empty and full locations to be located at either end of the resistor card. Matching of the total resistance and the shape of the resistance characteristic to match the fuel tank shape and angle versus resistance specifications is easily obtained by changing resistor ink resistance through selecting various ink compositions and by the laser trimming techniques employed in the final individual adjustment.

The cost of the variable resistor can be reduced by minimizing or eliminating the amount of expensive conductive ink needed to provide the variable resistor.

In addition, the resistor card of the present invention has a relatively long lifetime and is resistant to wear since contact between the wiper contact and the resistor card is primarily or exclusively against a resistor material.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A variable resistor comprising:
   a substrate;
   a generally arcuate-shaped film resistor disposed on said substrate for providing an arcuate wiper track, said film resistor including a plurality of angularly offset extension areas extending radially from said wiper track, said extension areas including a plurality of trim cuts extending substantially radially toward but not entering said wiper track, said trim cuts arranged to provide a predetermined resistance characteristic along said wiper track;
   a first end pad disposed on said substrate and electrically connected to one end of said wiper track for providing a first electrical connection for said variable resistor; and
   wiper contact means for slidably engaging said wiper track and for providing a second electrical connection for said variable resistor.

2. A resistor card for a variable resistor comprising:
   a substrate comprised of insulating material;
   a generally arcuate-shaped film resistor deposited on said substrate for providing an arcuate wiper track, said film resistor including a plurality of angularly offset extension areas extending radially from said wiper track, said extension areas including a first extension area in the arcuately central portion of said film resistor and disposed radially inward from said wiper track; and
   a first end pad deposited on said substrate and electrically connected to one end of said film resistor wiper track.

3. A resistor card for a variable resistor comprising:
   a substrate comprised of insulating material;
   a generally arcuate-shaped film resistor deposited on said substrate for providing an arcuate wiper track, said film resistor including a trim area extending radially from said wiper track and a plurality of spaced apertures located in said wiper track;
   a first end pad deposited on said substrate and electrically connected to one end of said film resistor wiper track; and
   a plurality of measurement pads, each measurement pad located in a respective one of said apertures.

4. The resistor card of claim 3 wherein the edges of each of said measurement pads is disposed between said substrate and said film resistor.

5. A variable resistor comprising:
   a substrate;
   a generally arcuate-shaped film resistor disposed on said substrate for providing an arcuate wiper track, said film resistor including a plurality of angularly offset extension areas extending radially from said wiper track, said extension areas including a plurality of trim cuts extending substantially concentrically to but not entering said wiper track, said trim cuts arranged to provide a predetermined resistance characteristic along said wiper track;
   a first end pad disposed on said substrate and electrically connected to one end of said wiper track for providing a first electrical connection for said variable resistor; and
   wiper contact means for slidably engaging said wiper track and for providing a second electrical connection for said variable resistor.

6. A variable resistor comprising:
   a substrate;
   a generally arcuate-shaped film resistor disposed on said substrate for providing an arcuate wiper track, said film resistor including a plurality of angularly offset extension areas extending radially from said wiper track;
   a first end pad disposed on said substrate and electrically connected to one end of said wiper track for providing a first electrical connection for said variable resistor;
   wiper contact means for slidably engaging said wiper track and for providing a second electrical connection for said variable resistor; and
   a plurality of measurement pads, each measurement pad located within said wiper track, said film resistor including an aperture at each respective measurement pad, each aperture having a size smaller than the respective measurement pad and the edges of each measurement pad being disposed beneath said film resistor.

7. A variable resistor comprising:
   a substrate;
   a generally arcuate-shaped film resistor disposed on said substrate for providing an arcuate wiper track, said film resistor including a plurality of angularly offset extension areas extending radially from said wiper track;
   a first end pad disposed on said substrate and electrically connected to one end of said wiper track for providing a first electrical connection for said variable resistor;
   wiper contact means for slidably engaging said wiper track and for providing a second electrical connection for said variable resistor;
   a first contact dwell pad arcuately extending from a first end of said wiper track, said first contact dwell pad comprised of a conductive material;
   said first end pad and said first contact dwell pad being disposed at the same end of said wiper track, said film resistor further including a first offset area disposed between said first end pad and said first contact dwell pad;
   a second contact dwell pad arcuately extending from a second end of said wiper track opposite said first end, said second contact dwell pad comprised of a conductive material; and
   a second end pad disposed on said substrate and electrically connected to said second end of said wiper track for providing a third electrical connection for said variable resistor;
   wherein said film resistor further includes a second offset area disposed between said second end pad and said second contact dwell pad.

8. A resistor card for a variable resistor comprising:
   a substrate comprised of insulating material;
   a generally arcuate-shaped film resistor deposited on said substrate for providing an arcuate wiper track, said film resistor including a plurality of angularly offset extension areas extending radially from said wiper track, said extension areas including a pair of second extension areas at the arcuate end portions of said film resistor and disposed radially outward from said wiper track; and a first end pad deposited on said substrate and electrically connected to one end of said film resistor wiper track.

9. A resistor card for a variable resistor comprising:
a substrate comprised of insulating material;
a generally arcuate-shaped film resistor deposited on said substrate for providing an arcuate wiper track, said film resistor including a plurality of angularly offset extension areas extending radially from said wiper track; and
a first end pad deposited on said substrate and electrically connected to one end of said film resistor wiper track;
said extension areas including a plurality of trim cuts extending substantially radially toward but not entering said wiper track, said trim cuts arranged to provide a predetermined resistance characteristic along said wiper track.

10. A resistor card for a variable resistor comprising:
a substrate comprised of insulating material;
a generally arcuate-shaped film resistor deposited on said substrate for providing an arcuate wiper track, said film resistor including a plurality of angularly offset extension areas extending radially from said wiper track; and
a first end pad deposited on said substrate and electrically connected to one end of said film resistor wiper track;
said extension areas including a plurality of trim cuts extending substantially concentrically to but not entering said wiper track, said trim cuts arranged to provide a predetermined resistance characteristic along said wiper track.

11. A resistor card for a variable resistor comprising:
a substrate comprised of insulating material;
a generally arcuate-shaped film resistor deposited on said substrate for providing an arcuate wiper track, said film resistor including a plurality of angularly offset extension areas extending radially from said wiper track;
a first end pad deposited on said substrate and electrically connected to one end of said film resistor wiper track; and
a plurality of measurement pads deposited on said substrate, each measurement pad being located within said wiper track, said film resistor including an aperture at each respective measurement pad, each aperture having a size smaller than the respective measurement pad and the edges of each measurement pad being deposited beneath said film resistor.

12. A method of making a resistor card having a predetermined resistance characteristic along an arcuate wiper track thereon, said method comprising the steps of:
providing an insulating substrate;
depositing a generally arcuate-shaped film resistor on said substrate including said arcuate wiper track, said film resistor including a plurality of angularly offset extension areas extending radially from said wiper track;
depositing a first end pad on said substrate in electrical connection to one end of said wiper track; and
introducing trim cuts into said extension areas to provide said resistance characteristic between said first end pad and respective points in said wiper track.

13. The method of claim 12 further comprising the step of measuring said resistance characteristic while introducing said trim cuts and controlling said trim cuts in accordance with any difference between the measured characteristic and the predetermined characteristic.

14. The method of claim 13 wherein said resistance characteristic is measured by directly contacting said wiper track.

15. The method of claim 13 further comprising the steps of:
depositing a plurality of measurement pads on said substrate, each measurement pad disposed in connection with one of said respective points in said wiper track; and
contacting said measurement pads to measure said resistance characteristic during said trim cut introducing step.

16. The method of claim 15 wherein said measurement pads are deposited within said wiper track and wherein said film resistor includes apertures in said wiper track to expose at least a portion of each respective measurement pad.

17. The method of claim 12 wherein said trim cuts are introduced by means of a laser.

18. The method of claim 12 wherein said trim cuts are substantially radial.

19. The method of claim 12 wherein a first extension area is deposited in the arcuately central portion of said film resistor radially inward from said wiper track.

20. The method of claim 12 wherein said extension areas include a pair of second extension areas at the arcuate end portions of said film resistor radially outward from said wiper track.

21. The method of claim 12 further comprising the step of depositing on said substrate a first contact dwell pad arcuately extending from a first end of said wiper track, said first contact dwell pad being comprised of a conductive material.

22. The method of claim 21 wherein said first end pad and said first contact dwell pad are disposed at the same end of said wiper track, said film resistor further including an offset area disposed between said first end pad and said first contact dwell pad, said method further comprising the step of introducing a trim cut in said offset area to provide a predetermined minimum resistance for said resistance characteristic.

23. A method of making a resistor card having a predetermined resistance characteristic along an arcuate wiper track thereon, said method comprising the steps of:
providing an insulating substrate;
depositing a generally arcuate-shaped film resistor on said substrate including said arcuate wiper track, said film resistor including a trim area extending radially from said wiper track and a plurality of spaced apertures located in said wiper track;
depositing an end pad on said substrate in electrical connection to one end of said wiper track;
depositing a plurality of measurement pads on said substrate, each measurement pad being located within a respective one of said spaced apertures;

sequentially contacting said measurement pads to determine the resistance between said end pad and each respective measurement pad; and introducing trim cuts into said trim area to provide said resistance characteristic between said end pad and respective measurement pads.

24. The method of claim 23 wherein said depositing steps employ silk screen techniques and wherein said end pad and said measurement pads are deposited prior to depositing said film resistor.

25. The resistor card of claim 9 wherein said trim cuts each have a width in the range of about 3 to 5 mils.

* * * * *